United States Patent
Uchida et al.

[19]

[11] Patent Number: 6,045,319
[45] Date of Patent: Apr. 4, 2000

[54] CARRIER TRANSPORT DEVICE

[75] Inventors: Hiroshi Uchida, Oumihachiman; Yasuo Hisa; Yasuo Miyake, both of Kyoto; Sanpei Kinoshita, Hachiouji, all of Japan

[73] Assignee: Murata Kikai Kabushiki Kaisha, Kyoto, Japan

[21] Appl. No.: 09/086,952

[22] Filed: May 29, 1998

[30] Foreign Application Priority Data

Aug. 11, 1997 [JP] Japan .................................... 9-228870

[51] Int. Cl.[7] .................................................. B65G 35/00
[52] U.S. Cl. .................... 414/676; 198/619; 112/DIG. 2; 269/8
[58] Field of Search ........................... 414/676; 198/619; 406/86, 88, 19; 335/285; 29/719; 112/470.06, DIG. 2; 269/8

[56] References Cited

U.S. PATENT DOCUMENTS

| 4,275,983 | 6/1981 | Bergman | 414/676 |
| 4,718,539 | 1/1988 | Fukuwatari et al. | 198/619 |
| 5,102,288 | 4/1992 | Kawasaka | 414/676 |
| 5,180,048 | 1/1993 | Kawada et al. | 198/619 |
| 5,251,741 | 10/1993 | Morishita et al. | 198/619 |
| 5,295,570 | 3/1994 | Grecksch | 198/619 |
| 5,309,049 | 5/1994 | Kawada et al. | 198/619 |

FOREIGN PATENT DOCUMENTS

| 798712 | 11/1988 | Canada | 414/676 |
| 54-20586 | 2/1979 | Japan | 406/88 |
| 7-238447 | 9/1995 | Japan . | |
| 1141829 | 2/1969 | United Kingdom | 414/676 |

*Primary Examiner*—Douglas Hess
*Attorney, Agent, or Firm*—Armstrong, Westerman, Hattori, McLeland & Naughton

[57] ABSTRACT

A carrier transport device is provided with a stator table comprised of a plurality of stators 4 which themselves are comprised of cores 2 and coils 3, and a carrier C in which permanent magnets m1–m4 are provided such that by passing an appropriate current through the coil, the cores of the stators are magnetized. The attraction or repulsion generated between the cores of the stators and the permanent magnets of the carrier is used to transport the carrier along the stator table in two dimensions. This carrier transport device allows for transport of a carrier in two dimensions with a simple design for quick transport of a carrier, and for reliably bringing the carrier to a stop at a predetermined location.

4 Claims, 10 Drawing Sheets

CARRIER TRANSPORT DEVICE

FIELD OF THE INVENTION

The present invention relates to a carrier transport device which can transport a carrier upon which a variety of articles can be placed and which can transport the carrier to predetermined positions within two dimensions. Parts or manufactured articles can be transported on the carrier, as can braider bobbins supplying yarn to be braided into braided structures in a braiding machine.

BACKGROUND OF THE INVENTION

Conventional carrier transport devices transport a carrier by means of belt conveyors, roller conveyors, linear-motor conveyors and the like. Carrier transport devices which transport bobbin carriers holding yarn wound bobbins along a path by engaging a holding pin of the bobbin carrier in openings between the teeth of the gears of a transport mechanism in braiding machines are also known.

These conventional carrier transport devices can be used to transport carriers in a single direction, but when the carrier must be transported in two dimensions within the same plane, the structure of the device becomes complicated. Further, these conventional carrier transport devices have difficulty reliably bringing the carrier to a stop at a desired location because of the rotational momentum of the driving mechanism and the inertia of the carrier.

In the carrier transport device of a braiding machine which drives a carrier engaged in the teeth of gears, the carrier track along which the carrier runs cannot be designed arbitrarily because the carrier track depends upon the layout of the gears and the holding pins. Consequentially, such a carrier transport device can only be used in a braiding machine for forming braided structures or in machines of similar design. Further, the carrier track of such a transport device is comprised of a narrow groove along which the carrier runs, and is comprised as a single element, to assemble multiple separable bars of a fixed width in a groove of a fixed narrow gauge makes operation relatively difficult and time-consuming, and consequentially makes the braiding machine more complicated and expensive. Further, interlocking gears must be rotated in order to run the carrier, making it very noisy.

SUMMARY OF THE INVENTION

It is an object of the present invention to propose a carrier transport device which solves the aforementioned problems of the conventional carrier transport devices and allows the carrier to be transported with a greater degree of freedom.

In order to accomplish this object, the present invention is provided first with a stator table comprised of multiple stators, the stators themselves comprised of a core and a coil, and a carrier in which permanent magnets are arranged. The cores of the stators are magnetized by flowing an appropriate current through the coil, and the attraction or repulsion created between the magnetized cores and the permanent magnets of the carrier is used to transport the carrier in two dimensions along the stator table. The present invention is secondly provided with an air ejection means which floats the carrier above the stator table. Thirdly, the present invention is provided with a control means for positioning multiple carriers upon which ride yarn wound bobbins, and for independently transporting a plurality of these carriers such that the present invention can be employed as a carrier for a braiding machine.

BRIEF DESCRIPTION OF THE ACCOMPANYING DRAWING

DETAILED DESCRIPTION OF THE PREFERRED EMBODIMENTS

Figure 1:
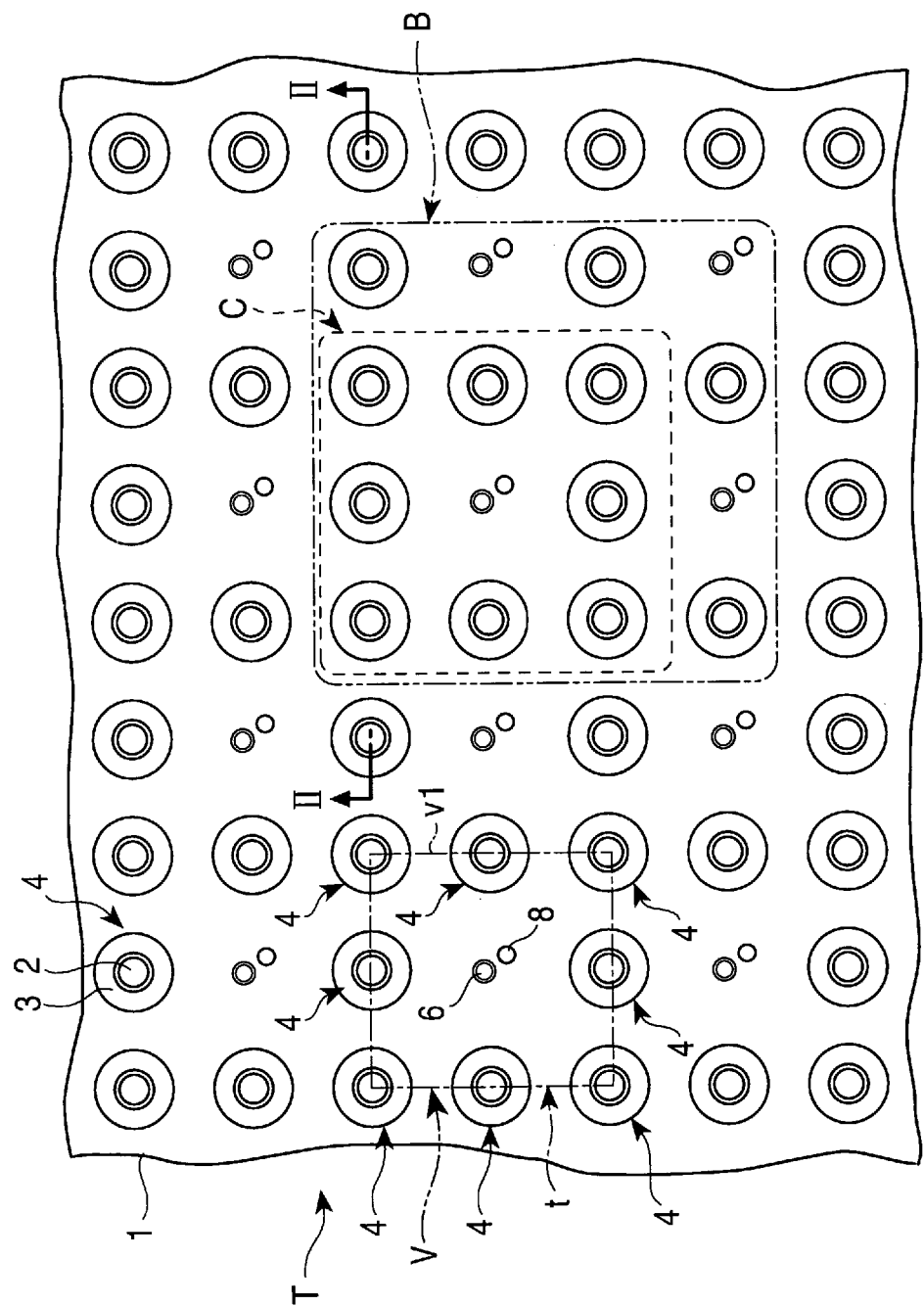
FIG. 1 is a planar view drawing of a section of the stator table of the carrier transport device of the present invention.
Figure 2:
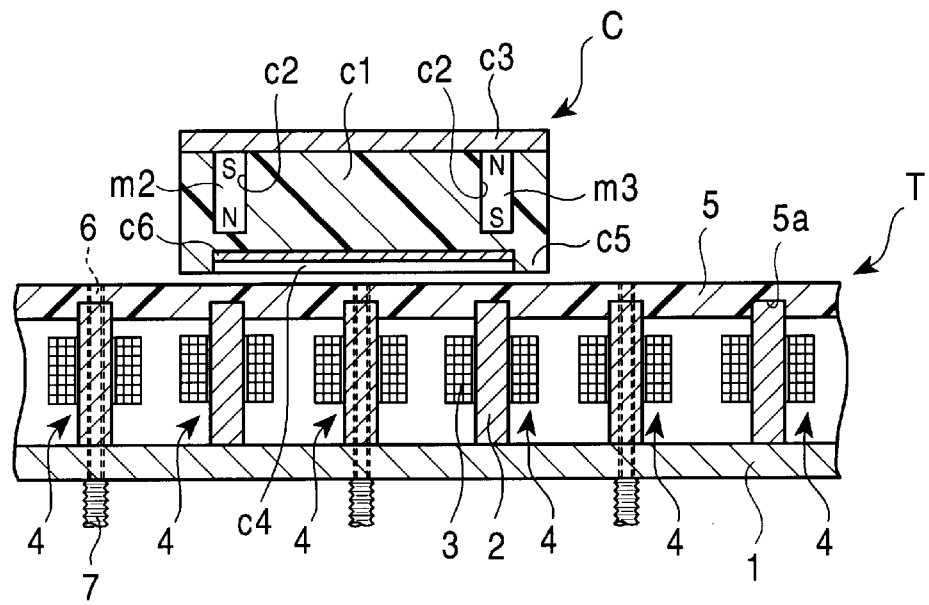
FIG. 2 is a lateral cross section drawing of the carrier and carrier transport device on line II—II of FIG. 1.

The preferred embodiments of the present invention are described below in reference to the accompanying drawings.

1 is the base plate composed of magnetically conductive iron, iron alloys, or the like. 2 is the core comprised of a magnetically conductive body which is stood upright on the base plate 1. The core 2 is enclosed with a tubular coil 3 which together comprises a stator 4. Further, the coils 3 are arranged between the base plate 1 and the top plate, described below.

The stators 4, each comprised of the core 2 and the coil 3, as shown in FIG. 1, form an imaginary square V with the stator 4 arranged at each of the four corners of the square V, and the stator 4 positioned between each of the corner stator 4 along the sides of the square V. The 8 stators forming the imaginary square V together comprise a stator unit t. A stator table T is comprised by extending the stator units t along the planar surface in two dimensions such that the multiple stator units t can be used in conjunction with neighboring stators 4 arranged in one side v1 of the square V. Each coil 3 functions independently from the other coils 3 by means of a central control device (not shown in the drawings) which magnetizes or demagnetizes each of the coils 3. Further, the coils 3 are comprised such that the polarity of the cores 2 can be changed by reversing the flow of the current.

5 is a top board arranged above the base plate 1, and is comprised of a non-magnetically conductive material like synthetic resin. Counter-sunk sections 5a are preferably formed on the bottom surface of the top board 5 into which the top of the cores 2 of the stators 4 are engaged. 6 is an air ejection pipe arranged in roughly the center of each stator unit t, and which runs through from the base plate 1 to the top board 5. The air ejection pipes 6 are comprised such that their top ends evenly meet the surface of the top board 5. Further, the air ejection pipes 6 jut out from the bottom of the base plate 1, and air supply hoses 7 are connected to the air ejection pipes 6. Each air supply hose 7 is supplied with high pressure air which is ejected from the air ejection pipe 6 on the command of a central control unit not shown in the drawings.

8 is a position sensor for confirming the position of the carrier, and is comprised of a photo-optic reflective sensor arranged in proximity to air ejection pipe 6. The position sensor 8 is counter-sunk inside the top board 5 in this embodiment, but can also be arranged in the base plate 1. The top board 5 may be comprised of a board of translucent or transparent synthetic resin.

Figure 3:
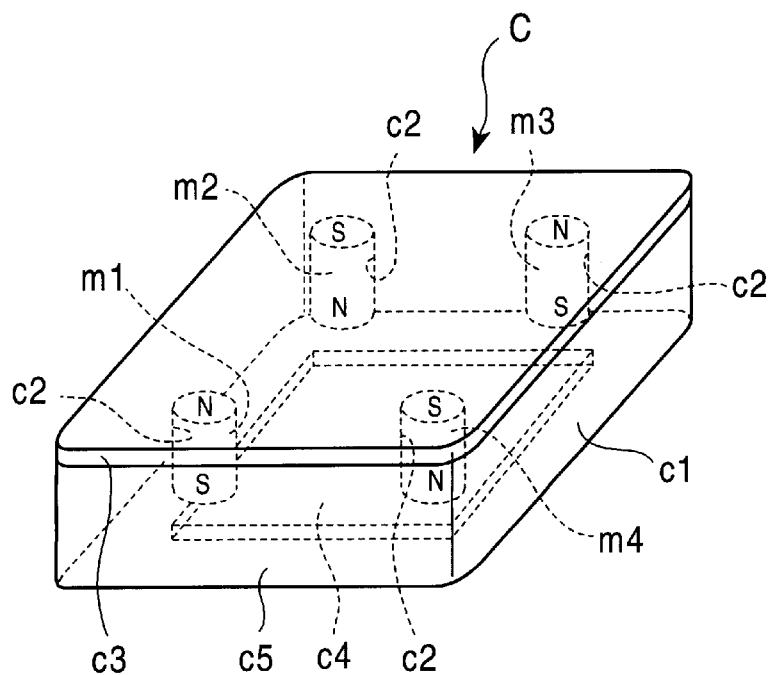
FIG. 3 is a perspective view drawing of a carrier of the carrier transport device of the present invention.

C is a carrier which travels along the stator table T such that it can be moved in two dimensions, and c1 is the carrier body comprised of a non-magnetically conductive material. Four openings c2 are formed in the carrier body c1 inside which cylindrical permanent magnets m1 through m4 are inserted, the arrangements of the magnet-filled openings c2 such that they correspond to the four corners of the imaginary square V of the stator units t. One pair of permanent magnets m1, m3 in opposing corners are given the same polarity, and the other pair of permanent magnets m2, m4 are given the opposite polarity. As shown in FIG. 3 the present embodiment, the opposing corner permanent magnets m1, m3 are polarized such that their top is North and their bottom is South. Consequentially, the tops of the opposing corner permanent magnets m2, m4 are South, and their bottoms are North.

c3 is a plate affixed to the surface of the carrier body c1, and comprised of a magnetically-conductive material like iron or an iron alloy. The plate c3 is arranged such that it is in contact with the four permanent magnets m1 through m4. c4 is a sunken air receiver arranged at the bottom of the carrier body c1 and formed by remaining a surrounding edge c5 of the bottom of the carrier body c1. Further, c6 is a reflector for bouncing back the beams emitted from the position sensor 8 for confirming the position of the carrier C, and is arranged on the bottom surface of the carrier body c1.

Figure 4:
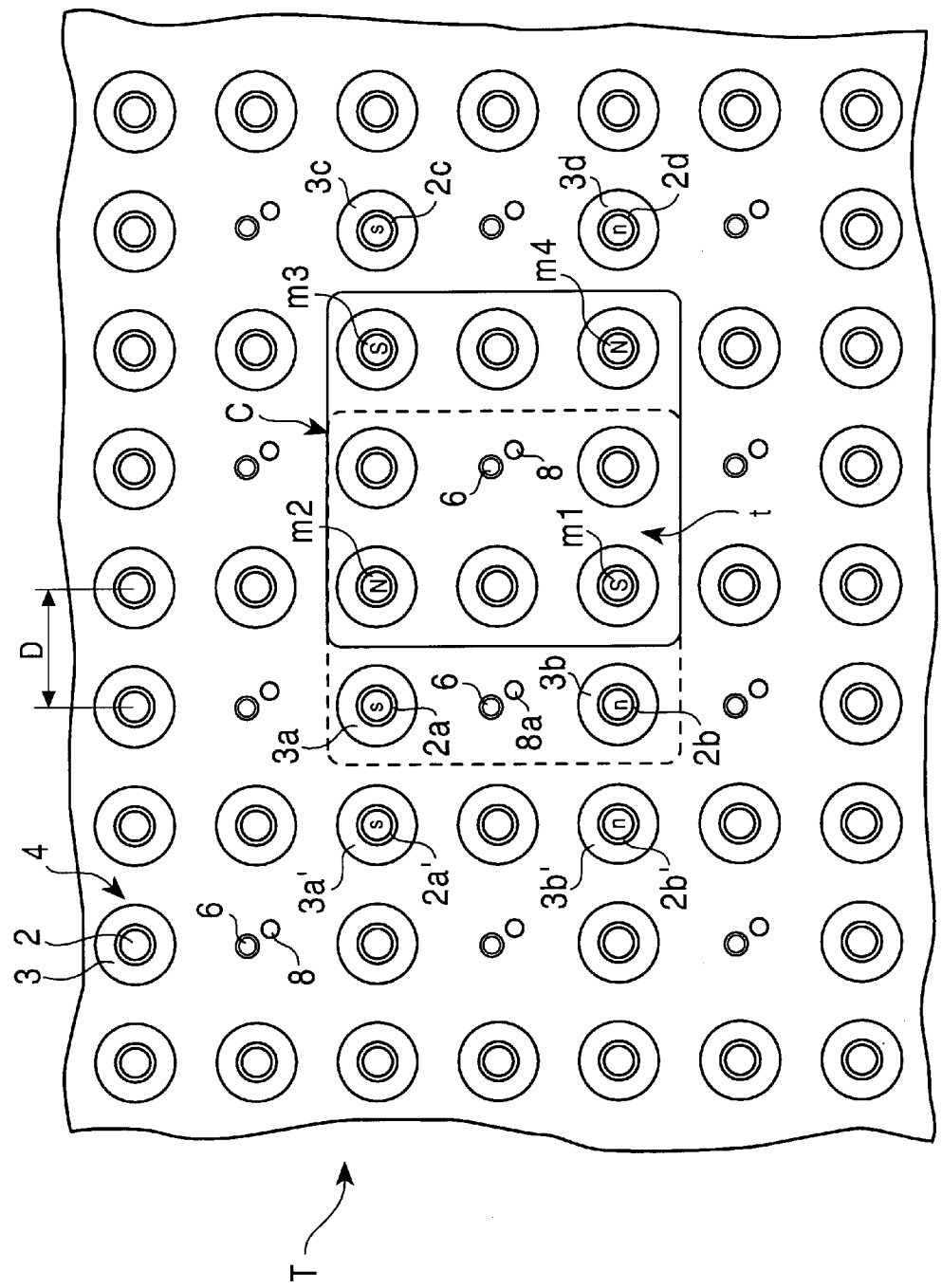
FIG. 4 is a planar view drawing of the carrier transport device of FIG. 1 which explains one aspect of the operation of the carrier transport device of the present invention.
Figure 5:
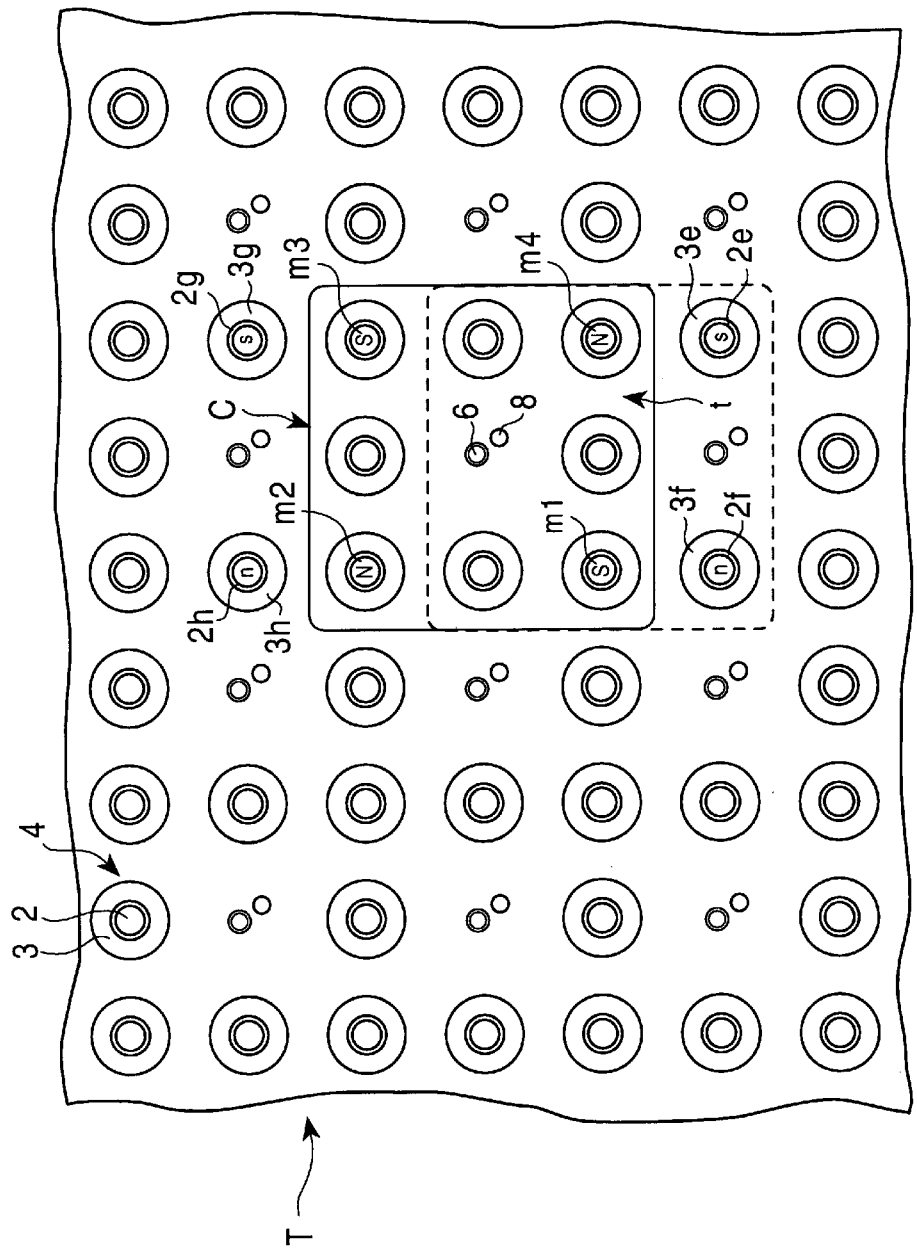
FIG. 5 is a planar view drawing of the carrier transport device of FIG. 1 which explains another aspect of the operation of the carrier transport device of the present invention.

Next, the carrier transport means will be explained in reference to FIG. 4 and FIG. 5. FIG. 4 and FIG. 5 show the polarity arrangement of the permanent magnets m1 through m4 of carrier C. In the drawings, N and S designate the polarities of the bottoms of these permanent magnets m1 through m4. The polarities of the cores 2 of the stator units t are indicated by n and s in accordance with the current flow direction in their coils 3.

In FIG. 4, each of the permanent magnets m1 through m4 arranged in the carrier C is positioned directly above one of the stator 4 arranged at the four corners of the imaginary square V. So arranged, when air ejection from the air ejection pipe 6 is stopped and when current to the coils 3 of the four corners of the imaginary square V is cut off, the permanent magnets m1 through m4 of the carrier C and the cores 2 of the stator unit t attract each other and hold the carrier C firmly against the top board 5.

Next, a left direction transport of the carrier C is explained in reference to FIG. 4.

In the condition described above, when air is ejected from the air ejection pipe 6 in the middle of the stator unit t, the air enters the air receiver c4 formed in the bottom of the carrier body c1, causing the carrier C to levitate above the top board 5.

Next, an appropriate current is flowed to the two coils 3a, 3b of the stator unit t immediately left of the carrier C which are in closest proximity to the carrier C. The flow of current to the coil 3a comprising the upper portion of the stator unit t is controlled such that the top of the core 2a is magnetized with a south polarity (indicated by s in FIG. 4), and the coil 3b of the lower portion of the stator unit t is controlled such that the top of its iron core 2b is magnetized with a north polarity (indicated by n in FIG. 4). When this occurs, the core 2a at the top of the stator unit t with s polarity, attracts the north magnetized permanent magnet m2 (indicated by N in FIG. 4) of the carrier C, and the core 2b at the bottom of the stator unit t with n polarity, attracts the south magnetized permanent magnet m1 (indicated by S in FIG. 4) of the carrier C. Consequentially, the floating carrier C as shown in FIG. 4, moves to the left by means of the attraction between the cores 2a, 2b of the stator unit t and the opposing polarities of the permanent magnets m1, m2 of the carrier C.

When current is flowed to the coils 3a, 3b as described above, an appropriate current may be flowed to the closest coils 3 of the stator unit t immediately to the right of the carrier C such that the core 2c at the top of the stator unit t is magnetized with an s polarity and the core 2d at the bottom of the stator unit t is magnetized with an n polarity. When this occurs, the core 2c at the top of the stator unit t provided with an s polarity, repels the permanent magnet m3 of the carrier C which also has an S polarity. Similarly, the core 2d at the bottom of the stator unit t provided with an n polarity repels the permanent magnet m4 of the carrier C which has the same N polarity. Thus, as shown in FIG. 4, the carrier C is pushed to the left by the repulsion between the permanent magnets m3, m4 of the carrier C and the cores 2c, 2d of the stator unit t. When added to the attractive force acting on the left side of the carrier C, the repulsive force on the right side causes the carrier C to be transported with a relatively strong force.

As described above, when carrier C is transported by one pitch D between neighboring stators 4, since the polarities of the permanent magnets m1 through m4 of the carrier C and the cores 2a through 2d of the stator uinit t below the permanent magnets m1 through m4 of the carrier C are opposed, the attraction of the magnets functions to move the carrier C quickly and stop the carrier C precisely at a fixed position. It should be noted that while the carrier C is moved over one pitch D, the air ejection from the air ejection pipe 6 is shut off in order not to interfere with the attraction of the permanent magnets m1 through m4 of the carrier C and the cores 2a through 2d of the stator unit t.

When the carrier C is moved to the left, the carrier's reflector c6 moves over the position sensor 8a located to the left. This causes the light emitted by the position sensor 8a to be reflected by reflector c6 back to the position sensor 8a. This triggers the central controller to stop the air discharge from the air ejection pipe 6. The carrier C is thus quickly and reliably moved to and stopped at a fixed location.

As described above, the air ejection pipe 6 discharges air only when the carrier C is transported, so when the carrier C comes to a stop, the carrier C comes to rest on the surface of the top board 5. Thus, when the carrier C is stopped as described above, air ejection from the air ejection pipe 6 does not interfere with the attraction of the permanent magnets m1 through m4 of the carrier C and the cores 2a through 2d of the stator unit t. Consequentially, the carrier C is quickly and reliably moved to and brought to a stop at a fixed location.

After the carrier C is moved, current is cut off to the coils 3a through 3d of the stator units t to the right or left side of the carrier C. As the carrier C is moved left, an appropriate current if flowed to the coil 3a' of the stator unit t which becomes the new left-neighboring unit, causing the left core 2a' to be magnetized with an s polarity. The lower coil 3b' is also charged with an appropriate current such that its core 2b' is magnetized with an n polarity. When this occurs, the s pole of the core 2a' at the left of the stator unit t and the N pole of the permanent magnet m2 of the carrier C attract, as do the n pole of the lower core 2b' and the S pole of the permanent magnet m1 of the carrier C (FIG. 4). This causes the carrier C which is being floated by the air ejected from air ejection pipe 6 to move to the left by means of the attraction of the permanent magnets m1, m2 of the carrier C to their corresponding the cores 2a', 2b' of the stator unit t. In this way, the carrier C is transported sequentially and intermittently to the left.

Similarly, when current is flowed to the coils 3a', 3b' as described above, an appropriate current can also be applied to the two coils 3 of the stator unit t immediately right of the carrier C as necessary such that the cores 2 of those stator unit t become magnetized with the same polarities as their corresponding permanent magnets m3, m4 of the carrier C. This creates repulsive force which, as shown in FIG. 4, causes the carrier C to be pushed to the left. In this way, the repulsion adds to the attractive force, thereby causing the carrier C to be transported to the left with relatively more force.

Further, when the carrier C is moved to the left and the position sensor 8a detects the carrier's reflector c6 moving over the position sensor 8a, current to the coils 3a through 3d of the stator unit t is shut off. At the same time, an appropriate current is flowed to the coil 3a' of the stator unit t immediately to the left of the carrier C, causing the core 2a' to take on an s polarity. An appropriate current is also flowed to the lower coil 3b', causing the core 2b' to take on an n polarity. This polarity repels the N polarity of the permanent magnet m2 of the carrier C. When the cores 2a', 2b' are thus magnetized, the s polarity of the upper core 2a' attracts the N polarity of the permanent magnet m2 of the carrier C while the n polarity of the lower core 2b' attracts the S polarity of the permanent magnet m1 of the carrier C. Thus carrier C can be continuously transported to the left without interruption by means of the attraction between the cores 2a', 2b' of the stator unit t and the permanent magnets m1, m2 of the carrier C, respectively.

In this case as well, the two coils 3 of the stator unit t immediately right of the carrier C can be electrified, and their cores 2 thus magnetized, as necessary. In this way, the cores 3 of the stator unit t and the permanent magnets m3, m4 of the carrier C create a repulsive force pushing the carrier C to the left, as shown in FIG. 4. This repulsive force adds to the attractive force described above, increasing the total force with which the carrier C is transported to the left.

The carrier C shown by a solid line in FIG. 4 can also be transported to the right, but since the process is the same as described above, a detailed explanation is herein omitted.

The carrier C can be transported in upper and lower direction as well as left and right. In FIG. 5, the coil 3e on the right side of the stator unit t immediately below the carrier C is applied an appropriate current causing the core 2e to be imparted with an s polarity. Similarly, the coil 3f on the left side of the stator unit t is applied an appropriate current causing its core 2f to take on an n polarity. When this occurs, the s pole of the core 2e at the right of the stator unit t attracts the N pole of the permanent magnet m4 of the carrier C, and the n pole of the core 2f at the left of the stator unit t attracts the S pole of the permanent magnet m1 of the carrier C. This attraction causes the carrier C which is floated by the air ejected from air ejection pipe 6 to move downward, as shown in FIG. 5, due to the attractive force between the cores 2e, 2f of the stator unit t and the permanent magnets m1, m4 of the carrier C.

As with lateral movement of the carrier C, the two coils 3 of the upper stator unit t closest to the carrier C can be charged with an appropriate current causing right core 2g to take on an s polarity and left core 2h to take on an n polarity. The n pole of the core 2h and the s pole of the core 2g repel the S pole of the permanent magnet m3 of the ccarrier C and the N pole of the permanent magnet m2 of the carrier C, respectively. The carrier C is thus pushed downward by the repulsion of cores 2h, 2g of the stator unit t and the permanent magnets m3, m2 of the carrier C, respectively. Consequentially, this repulsive force added to the attractive force described above increases the total force with which the carrier C is moved.

The carrier C shown by a solid line in FIG. 5 can also be transported upwards, but since the process is the same as described above, a detailed explanation is herein omitted.

Figure 6:
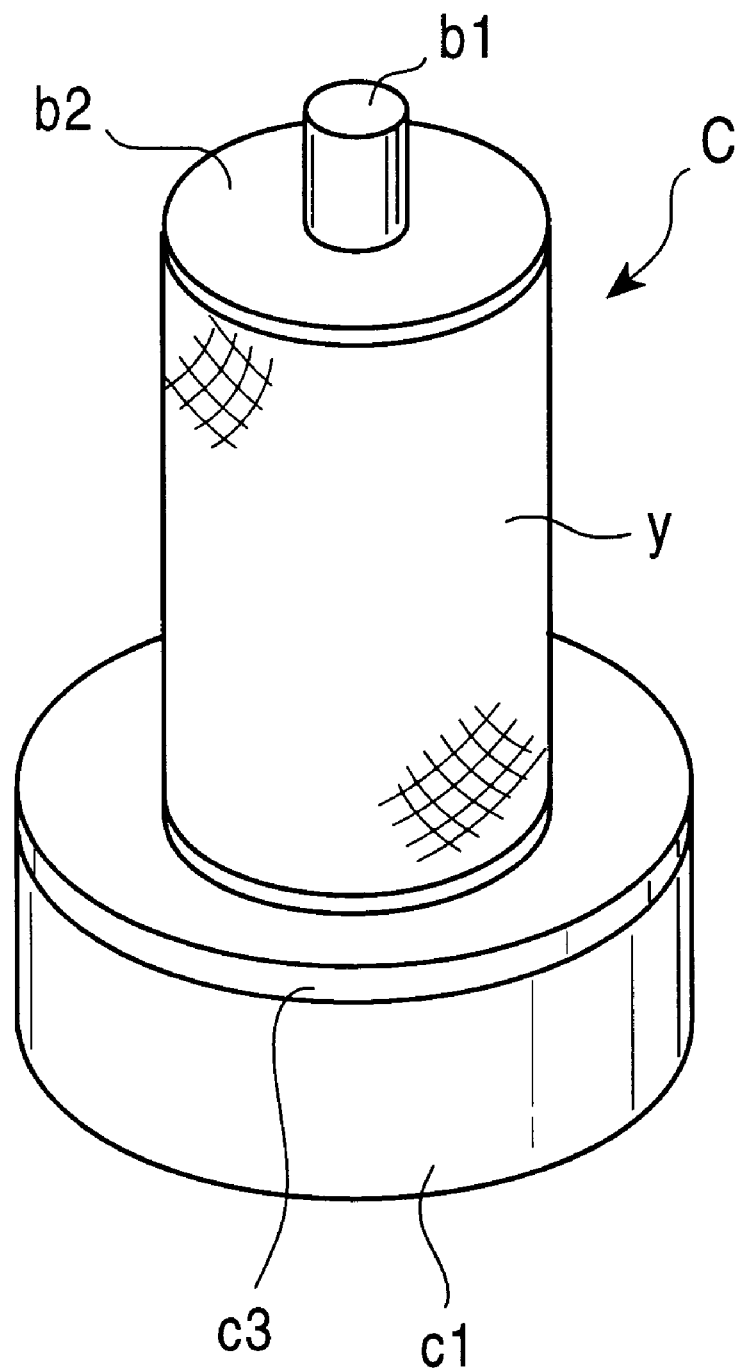
FIG. 6 is a perspective view drawing of an alternate embodiment of a carrier of the carrier transport device of the present invention.

FIG. 6 shows a spindle b1 standing on the carrier C which is formed in a roughly round, flat shape, and which is designed for use in a braiding machine. A bobbin b2 around which a yarn y has been wound is inserted around the spindle b1. By appropriately transporting a plurality of these bobbin-loaded carriers C along the stator table T, the yarn y drawn from the bobbin b2 can be crossed at the braiding point of the braiding machine in order to form a braided structure. Thus, by moving these bobbin-loaded carriers C two-dimensionally, the plan of the carrier track can be easily modified, and consequentially, the potential braiding forms the braiding machine can create is increased. Further, in contrast to the transport devices of conventional braiding machines, there is no need to provide a narrow groove for the carrier to run along, so the time and cost needed to manufacture the braiding machine can be reduced. Still further, there are no interlocking gears that rotate to move the carrier, so the noise problem of conventional braiding machine can also be resolved.

FIG. 7 through FIG. 12 are now used to explain the braiding system in which the bobbin-loaded carrier C of FIG. 6 is transported over the stator table T.

Figure 7:
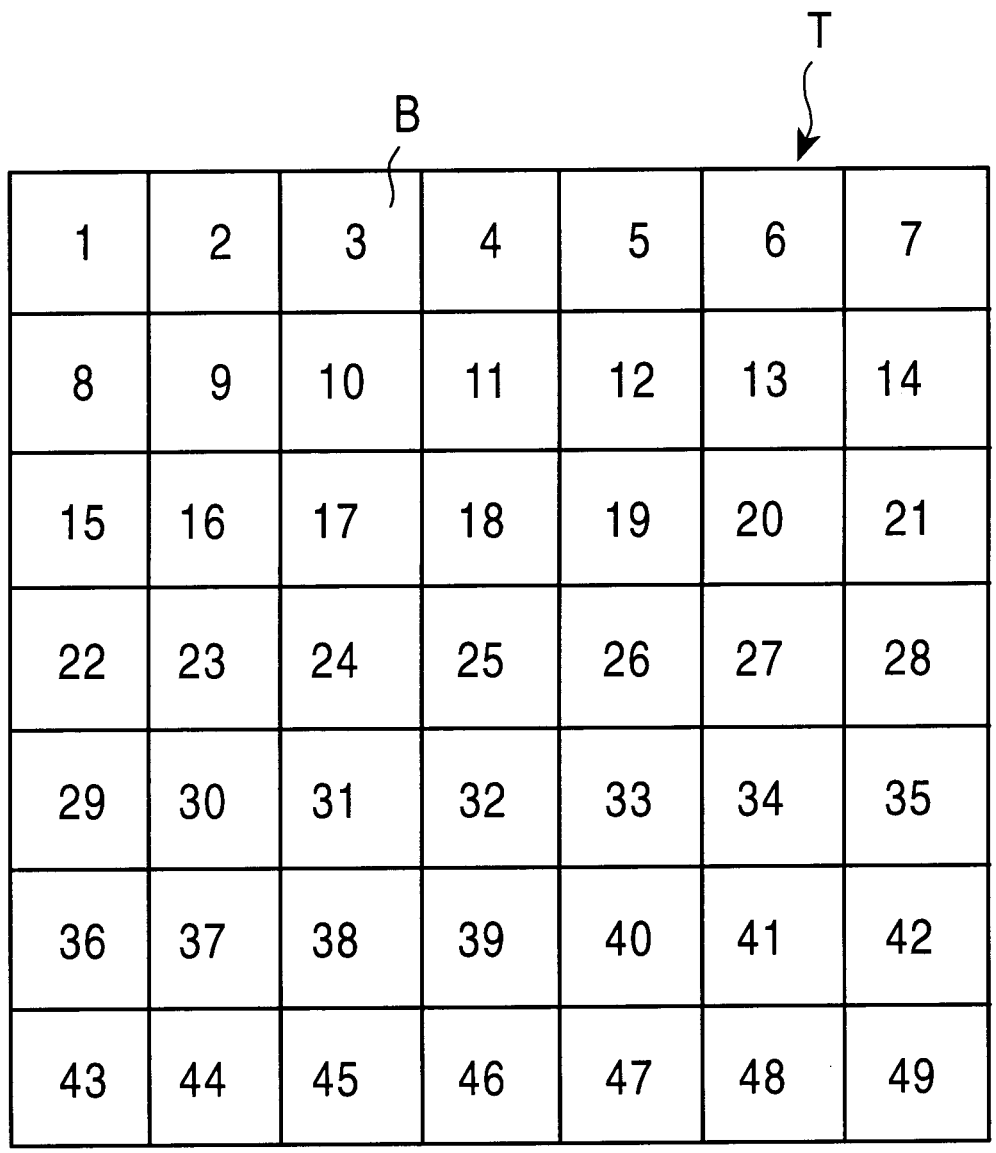
FIG. 7 is a drawing of the arrangement of the stator blocks in an example of the carrier transport device of the present invention.

In this embodiment of the present invention, the stator table T is comprised, as shown in FIG. 7, of a matrix of 7 rows and 7 columns of stator blocks B. Each stator block B is comprised of 12 individual stators 4 surrounded by a two dot chain line in FIG. 1. This stator block B is comprised of one additional stator 4 added onto each three stator element rows and column of the stator unit t. Moreover, each of the 49 stator blocks within the matrix is assigned an address number from 1 to 49.

As shown in FIG. 8 and FIG. 9, 16 bobbin carriers C1 through C16 are arranged continuously on the stator table T and each bobbin carrier C is put on the one stator block B comprising the stator table T. Each of the bobbin carriers C1 through C16 is comprised such that, when appropriately transported by the bobbin carrier transport means described below, its yarn can be braided into a braided structure. The transport program of the line of bobbin carriers C1 through C16 is now explained.

Figure 8A:
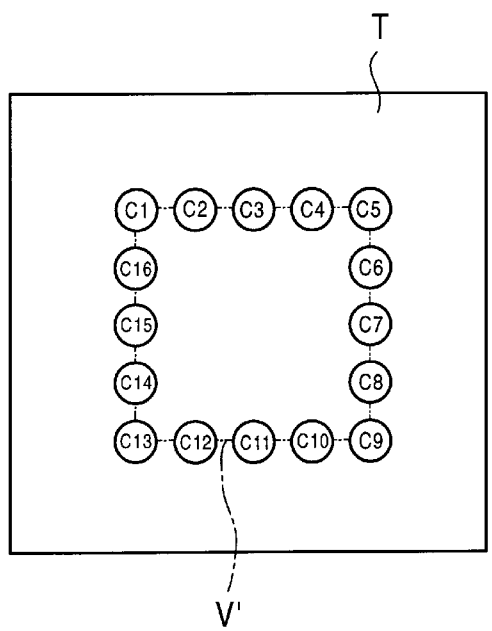
FIG. 8 is an outline drawing showing the transport order of bobbin carriers when the carrier transport device is adapted for use in a braiding machine.
Figure 8B:
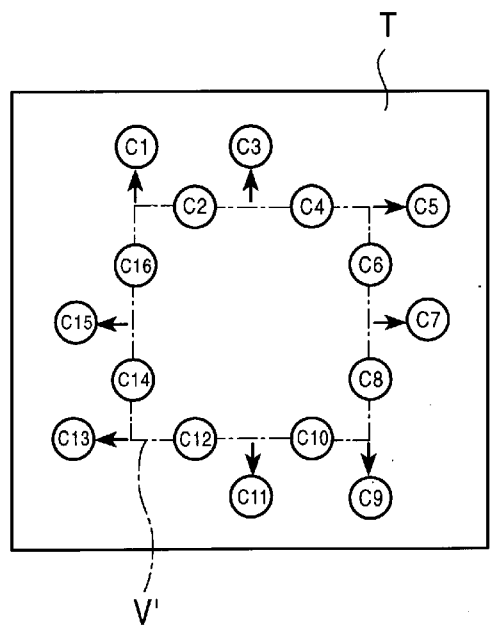
Figure 8C:
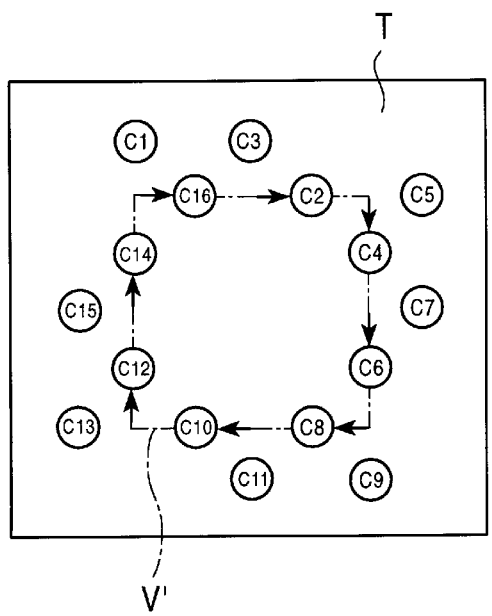
Figure 8D:
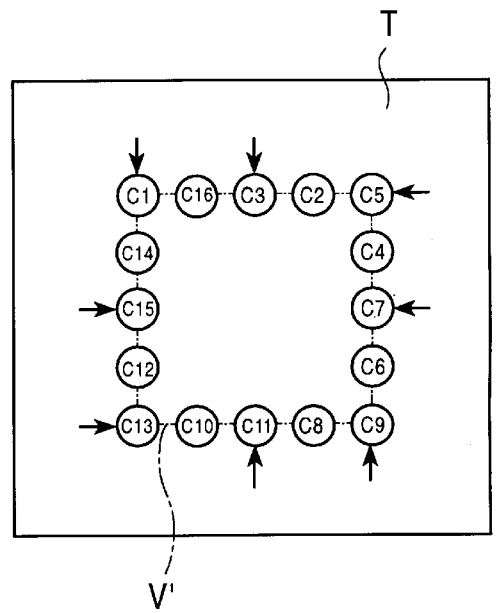

As shown in FIG. 8A, the 16 bobbin carriers C1 through C16 form an imaginary square V', with each side of the square V' comprised of a line of 5 bobbin carriers C. From this state, the odd numbered bobbin carriers C1, C3, . . . C15 are, as shown in FIG. 8B, moved by one stator block B portion on the outside of the imaginary square V'. This movement is such that in every side of three odd numbered carriers C1, C3, C5, for example, the carrier C5 positioned at one of corners is moved by one stator block B portion in a direction relatively perpendicular to the moving direction of the other two carriers C1, C3. Then, the even numbered bobbin carriers C2, C4, . . . C16 which remain in each side of the imaginary square V' are transported along the sides of the imaginary square V' in a clockwise direction by two stator blocks B portion at a time, as shown in FIG. 8C. As shown in FIG. 8D, the odd numbered carriers C1, C3, . . . C15 which had been moved outside are then returned to the sides of the imaginary square V'.

Figure 9A:
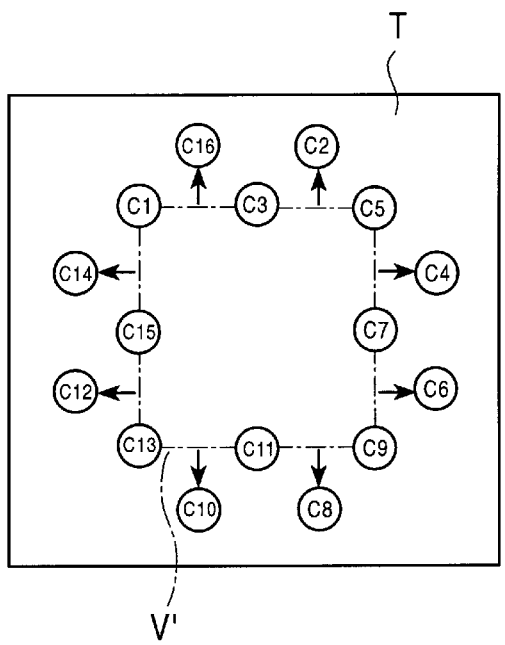
FIG. 9 is an outline drawing showing the transport order of bobbin carriers continued from FIG. 8.
Figure 9B:
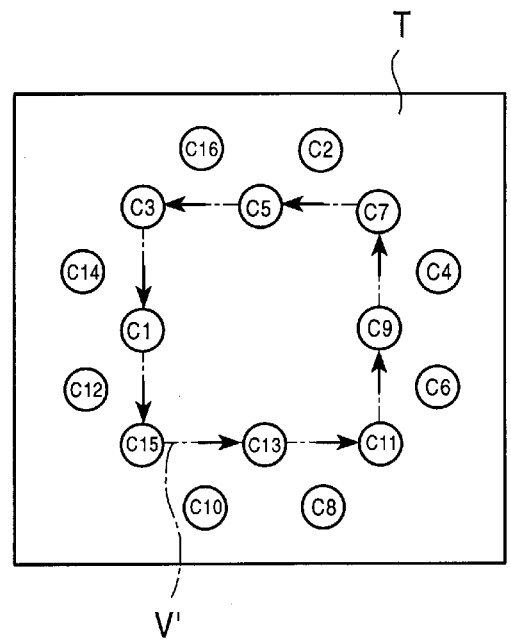
Figure 9C:
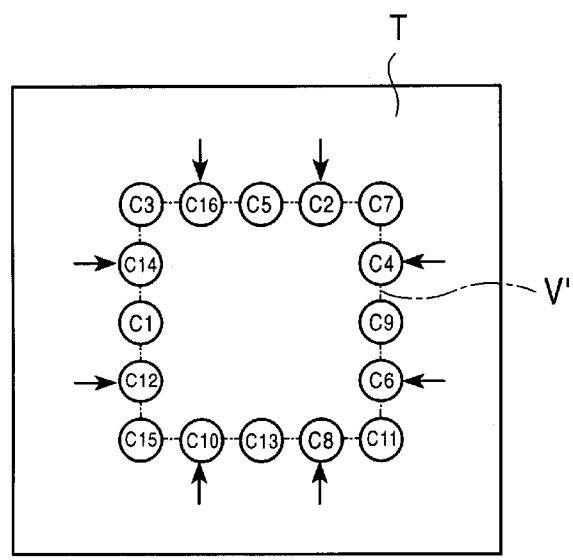
Figure 10:
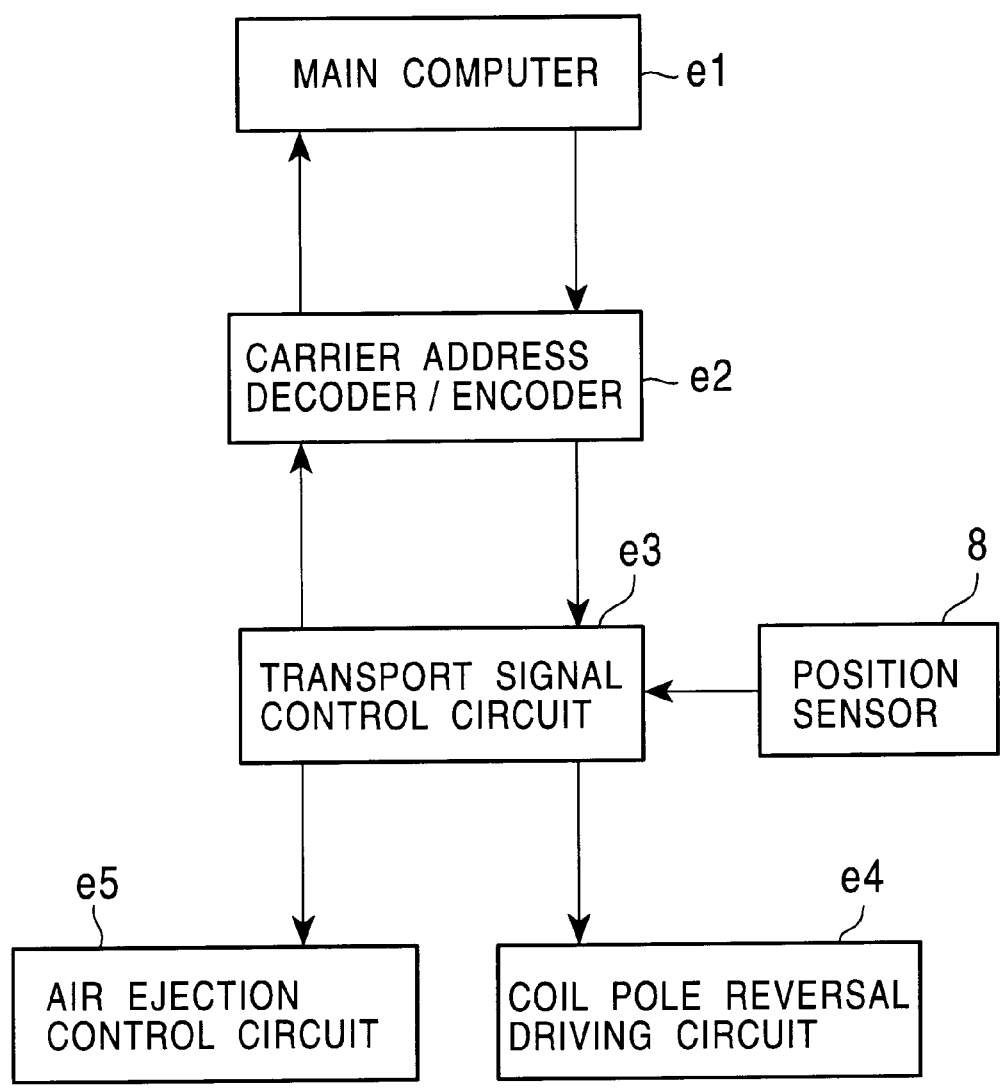
FIG. 10 is a block diagram of the bobbin carrier transport device when the present invention is adapted for use in a braiding machine.

Next, from this carrier arrangement shown in FIG. 8D, the even numbered carriers C2, C4, . . . C16 are moved by one stator block B portion on the outside of the imaginary square V', as shown in FIG. 9A. Then the odd numbered bobbin carriers C1, C3, . . . C15 which remain in each side of the imaginary square V' are transported along the sides of the square in a counter-clockwise direction by two stator blocks B portion at a time, as shown in FIG. 9B. The even numbered bobbin carriers C2, C4, . . . C16 which had been moved outside, are returned to the sides of the imaginary square V', as shown in FIG. 9C.

Thus, as described above, a braided structure can be braided by thus transporting the 16 bobbin carriers C1 through C16 over the stator table T.

The bobbin carrier transport means is now described.

The braided structure is braided by transporting the bobbin carriers C according to a transport program for each individual bobbin carrier C, but the transport program for each bobbin carrier C is directed by a main computer e1. Before braiding, the address 1–49 corresponding to the location of each bobbin carrier C1 through C16 within the stator block B shown in FIG. 7 is stored in the main computer e1. The main computer e1 also stores the magnetizing programs and polarities of the cores 2 of the stators 4 of each stator block B based upon information supplied from the position sensors 8 in order to direct the transport of the bobbin carriers C1 through C16 according to the aforementioned program. The main computer e1 further stores data on which the air ejection pipes 6 are active, and which the bobbin carriers C are levitated based on information supplied by the position sensors 8.

When the braiding of the braided structure begins, the main computer e1 first outputs the number of the carriers C which are to be moved and the address of the stator block B to which they are to be moved to carrier address decoder/encoder e2 (hereinafter referred to as "CODEC"). Based on this output from the main computer e1, the CODEC e2 determines the direction in which the carriers C should be moved. Next, the output of the CODEC e2 is sent to a transport signal control circuit e3 which operates a coil pole reversal driving circuit e4. The coil pole reversal driving circuit e4 then magnetizes the specified cores 2 of the stators 4 of the specified stator blocks B to either N or S polarities, along with activating the specified air ejection pipes 6 by means of an air ejection control circuit e5. In this way, the specified bobbin carriers C are moved, and when the position sensors 8 of the stator blocks B to which the carriers C are moved detects the movement of the carriers C, they so signal the transport signal control circuit e3. A signal indicating that transport has been completed is then sent from the transport signal control circuit e3 to the CODEC e2. The CODEC e2 then outputs the number of the bobbin carriers C that were moved and a transport completion signal to the main computer e1 based on the aforementioned transport completion signal. When movement of the bobbin carriers C has been completed, air discharge from the air ejection pipes 6 is terminated via the air ejection control circuit e5.

Next, the main computer e1 outputs to the CODEC e2 the number of the bobbin carriers C which are to be moved and the addresses of the stator blocks B to which they are to be moved. Based on this output from the main computer e1, in the same manner as described above, the CODEC e2 determines the direction in which the carriers C should be moved and sends a signal indicating the determined direction to the transport signal control circuit e3. The transport control circuit e3 further records the position signals of the current bobbin carrier C sent from the position sensors 8.

Based upon the direction determining signal from the CODEC e2 and the bobbin carrier position signal from the position sensors 8, the transport signal control circuit e3 operates the coil pole reversal driving circuit e4 such that the specified cores 2 of the stators 4 of the specified stator blocks B are polarized to either N or S polarities. Along with activating the specified air ejection pipes 6 by means of the air ejection control circuit e5, this causes the carriers C to be transported.

Thus, as previously described, the predetermined bobbin carriers C are moved, and when the position sensors 8 of the stator blocks B to which the carriers C are moved detect the movement of the carriers C, they so signal the transport signal control circuit e3. A signal indicating that transport has been completed is then sent from the transport signal control circuit e3 to the CODEC e2. The CODEC e2 then outputs the number of the bobbin carriers C which were moved and a transport completion signal to the main computer e1 based on the aforementioned transport completion signal. When movement of the bobbin carriers C has been completed, air discharge from the air ejection pipes 6 is terminated by the air ejection control circuit e5. In this way the carriers C are transported, in order, to their specified locations, and the braided structure is formed.

Figure 11:
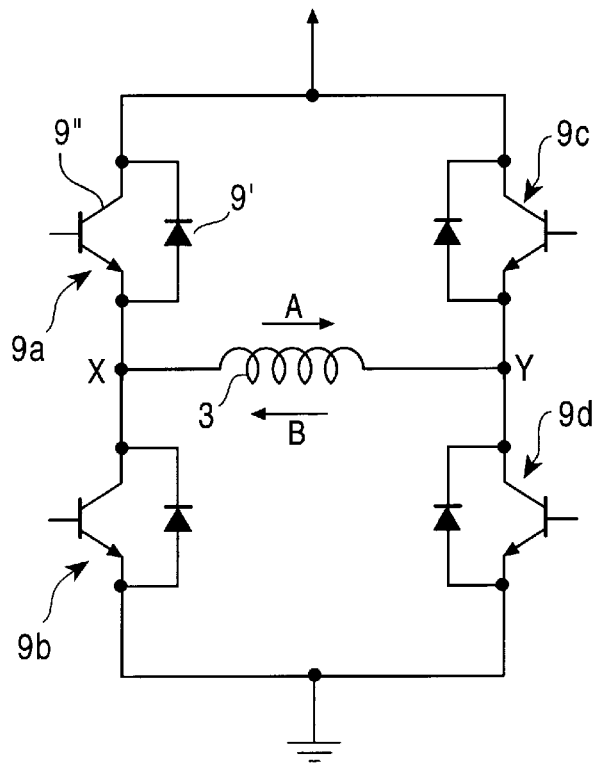
FIG. 11 is the preferred embodiment of the driving circuit for switching the polarities of the coils in the carrier transport device of the present invention.

Next, an example of the coil pole reversal driving circuit e4 is explained in reference to FIG. 11.

Switch circuits 9a through 9d which are comprised of parallel diodes 9' and transistors 9", as shown in FIG. 11, has four switches comprised of directly connected switches 9a and 9b, and directly connected switches 9c and 9d. Consequentially, two of the switches 9a, 9d can be turned on such that current flows to the coil 3 in the direction indicated by arrow A, polarizing the X side of the coil 3 such that it becomes magnetic S. Conversely, when switches 9b and 9c are turned on, current flows to the coil 3 in the direction of the B arrow such that the X side is polarized magnetic N. Further, when all the switches 9a through 9d are off, the coil 3 is demagnetized.

Figure 12:
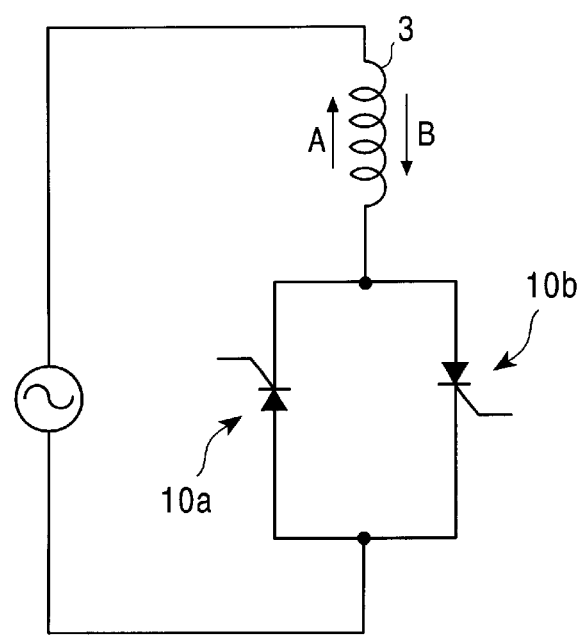
FIG. 12 is an alternate embodiment of the driving circuit for switching the polarities of the coils in the carrier transport device of the present invention.

FIG. 12 shows coil pole reversal driving circuit e4 comprised of two thyristors 10a, 10b connected in parallel, and the coil 3 of the stator 4 connected directly. In this case, when the thyristor 10a is ON and the thyristor 10b is OFF, current flows in the coil 3 in the A direction, and as shown in FIG. 11, the top of the coil 3 is magnetized to an N polarity. Further, when thyristor 10a is OFF and thyristor 10b is ON, current flows in the coil 3 in the B direction, and as shown in FIG. 11, the top of the coil 3 is magnetized to an S polarity. When thyristor 10a and 10b are both OFF, the coil 3 is demagnetized.

The above-described embodiment has been described using a stator unit t comprised of an imaginary square V comprised of eight stators 4, four on each corner and four in between the corner stator elements along the sides of the imaginary square V. It should be noted that it is also possible to comprise the stator unit t of any equilateral polygon, for example, an equilateral pentagon or hexagon. Similarly, the carrier C may be provided with an appropriate number of permanent magnets corresponding to the stators 4. Further, the number of stators 4 comprising a stator block B may be similarly adjusted.

As comprised above the present invention achieves the following results.

The present invention enables transport of a carrier in two dimensions wherein the carrier can be moved quickly and stopped reliably at a predetermined location with a simple design.

The present invention is provided with air ejection pipes for levitating the carrier, and therefore frictional resistance between the carrier and the stator table are eliminated. Consequentially, smooth carrier transport can be achieved.

Further, since the air ejection means is activated only when the carrier is moved, the air ejection does not interfere with the attraction between the permanent magnets of the carrier and the magnetized cores of the stator unit when the carrier comes to a stop, and the carrier can reliably be brought to a stop at a predetermined location.

By transporting a bobbin-loaded carrier in two dimensions, changing the plan of the carrier track is simplified, and consequentially a greater variety of braided structures can be braided.

Further, since there is no need to provide a narrow-gauge groove for the carrier to run along, braiding machine construction time and manufacturing costs can be reduced.

Further still, since the carrier is not driven by the rotation of interlocking gears as in conventional braiding machines, the noise level of the braider can be reduced.

What is claimed is:

1. A carrier transport device provided with a stator table and a carrier;

the stator table comprised of multiple stators having a core and a coil, and the carrier comprised of a non magnetically conductive material in which permanent magnets are arranged, such that when an appropriate current flows to a coil, the corresponding core is magnetized, and the resultant attraction or repulsion between the magnetized cores of the stators and the permanent magnets of the carrier is used to transport the carrier two dimensionally along the stator table.

2. The carrier transport device as in claim 1 wherein;

an air ejection means is provided to levitate the carrier above the stator table such that the air ejection means is activated only when the carrier is moved.

3. The carrier transport device as in claim 2 wherein:

multiple carriers upon which load yarn would bobbins are arranged on the stator table, and a control means controlling the transportation of the multiple carriers is provided, and the carriers are used as carriers in a braiding machine.

4. The carrier transport device as in claim 1 wherein;

multiple carriers upon which load yarn wound bobbins are arranged on the stator table, and a control means controlling the transportation of the multiple carriers is provided, and the carriers are used as carriers in a braiding machine.

* * * * *